United States Patent [19]
Fischer et al.

[11] 3,854,857
[45] Dec. 17, 1974

[54] MOLD OPENING AND CLOSING DEVICE FOR AN APPARATUS MAKING HOLLOW BODIES FROM THERMOPLASTIC MATERIAL

[75] Inventors: Stefan Fischer, Lohmar; Peter Galden, Cologne-Ehrenfeld; Helmut Scharrenbroich, Neuenhaus/Siegburg; Dieter Wollschlager, Oberpleis, all of Germany

[73] Assignee: Zinpro Corportion, Excelsior, Minn.

[22] Filed: Sept. 4, 1973

[21] Appl. No.: 394,080

Related U.S. Application Data

[63] Continuation of Ser. No. 142,523, May 12, 1971, abandoned.

[30] Foreign Application Priority Data
May 12, 1970  Germany .................. 2023094

[52] U.S. Cl. ............... 425/214, 425/DIG. 213, 425/DIG. 205
[51] Int. Cl. ......................... B29c 5/06
[58] Field of Search .. 425/450 R, 450 C, DIG. 220, 425/DIG. 222, DIG. 205, DIG. 213, 326 B, 214, 214/1 BB

[56] References Cited
UNITED STATES PATENTS

| | | | |
|---|---|---|---|
| 2,901,769 | 9/1959 | Sherman et al | 425/326 B |
| 2,903,740 | 9/1959 | Parfrey | 425/325 B |
| 3,402,431 | 9/1968 | Fogelberg et al | 425/DIG. 205 |
| 3,583,031 | 6/1971 | Kader et al | 425/326 B X |
| 3,685,943 | 8/1972 | Fischer | 425/326 B |

FOREIGN PATENTS OR APPLICATIONS
3,916,941  8/1964  Japan ............. 425/DIG. 205

Primary Examiner—Francis S. Husar
Assistant Examiner—David S. Safran
Attorney, Agent, or Firm—Dowell and Dowell

[57] ABSTRACT

A thermoplastic molding device comprising mold halves moved by a single drive to both an open and a closed position, and also to a receiving position, for receiving a pre-form, and to a shaping or blowing position and back. Movement is controlled by supporting the mold halves on a carriage means and moving said carriage means with respect to another carriage means or a movable frame.

6 Claims, 2 Drawing Figures

MOLD OPENING AND CLOSING DEVICE FOR AN APPARATUS MAKING HOLLOW BODIES FROM THERMOPLASTIC MATERIAL

This is a continuation of application Ser. No. 142,523, filed May 12, 1971, now abandoned.

BACKGROUND OF THE INVENTION

The invention relates to devices for making hollow bodies from thermoplastic material, in particular by the blowing process comprising mold halves or grips movable back and forth between a receiving position for a blank or preform and a shaping or blowing position and controllable accordingly to open and close.

In the known devices of this kind, the closing and opening of the molds or grips and their movement from the receiving position, for the preform, to the blowing position requires special drive elements, for example hydraulic control elements. The closing and opening must be controlled in a time sequence. Thus, drive and control means are necessary.

The object of this invention is to provide a simplified drive device which requires only one drive element for the opening and closing of the molds as well as for the movement of the molds from the receiving position, for the preform, to the shaping position and back.

SUMMARY

For this purpose, the invention provides - in a device for making hollow bodies from theroplastic materials, the device having mold halves or grips movable back and forth between a receiving position for a moldable preform and a shaping or blowing position - a drive element which acts directly on control elements for controlling the opening and closing movement of the mold halves and which, with delay, possibly over intermediate devices, takes along in one or the other direction a support for the mold halves whose movement is braked relatively to the machine frame, in order to move it synchronously with the control elements into one or the other end position.

In a preferred embodiment the drive element may be, for example, a crank arm or a hydraulic cylinder which acts upon a first carriage. The first carriage is slidable in the machine frame and controls the opening and closing movement of the mold halves. The mold halves are carried by a second carriage disposed in the machine frame. The second carriage is connected to the first carriage with interposition of a certain dead motion and is braked in its movement in comparison with the first carriage. In one embodiment the first carriage may be coupled with the second carriage by a drive rod. The drive rod has two spaced stops which cooperate with a stop on the second carriage. The second carriage may be provided with an adjustable brake device. The brake device prevents movements of the second carriage with respect to the machine frame until the stops of the drive rod engage the second carriage.

The first carriage controls the opening and closing movement of the mold halves and comprises two spars displaceably mounted in the machine frame. The spars are connected at their two ends by yokes. The drive element acts directly upon one of these two yokes. The drive rod for the second carriage is then connected with this drive yoke. At the other yoke, or respectively at the ends of the spars connected therewith, two drive links may be articulated by one end, while at their other ends they are articulatedly connected with one of two holding arms. The two holding arms connect the mold halves together in a tong-like fashion by a joint. The common joint of these holding arms is arranged upon the second carriage. The length of the drive links should be such that the spars serving for their control lie with their axes approximately at right angles to the longitudinal axis of the links in the closed position of the mold holding arms.

DESCRIPTION OF THE PREFERRED EMBODIMENT

Figure 1:
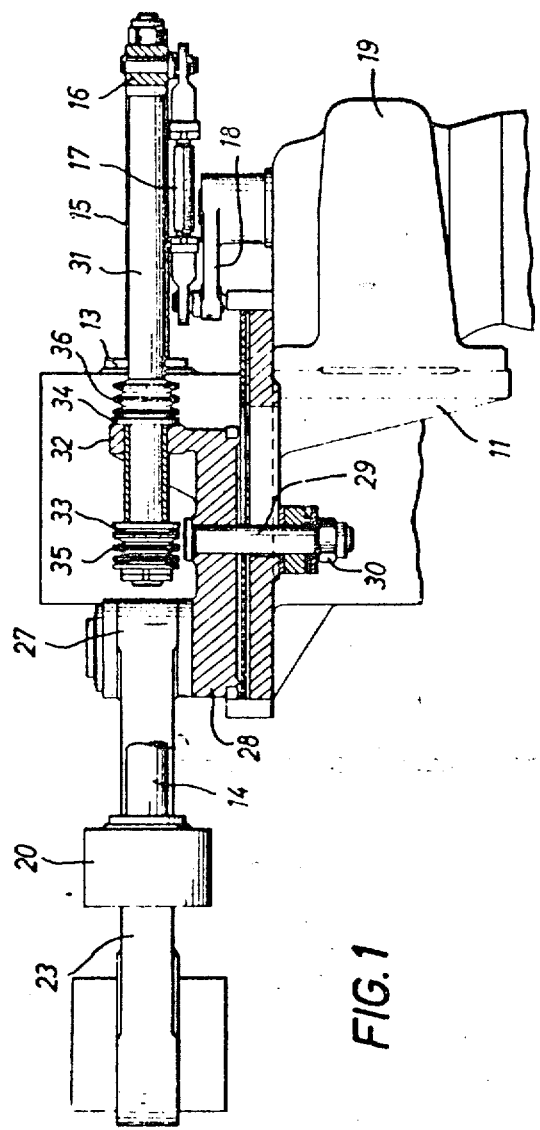
FIG. 1 shows the device, partially sectioned, in elevation.

In the form of execution of the device shown in the drawing, two guides 12 and 13 for two spars 14 and 15 are arranged on a bracket 11 of the machine frame. At their rear ends the spars 14 and 15 are connected together by a yoke 16. The yoke 16 is coupled via a connecting rod 17 to a crank arm 18. The crank arm 18 serves as a drive element and is, in turn, driven by an electric motor 19. The motor 19 is affixed to the bracket 11. The front ends of yokes 14 and 15 are interconnected by a cross-piece 20. Both spars 14 and 15 are joined by links 21 and 22, respectively, to holding arms 23 and 24 respectively. The holding arms 23 and 24 hold the two mold halves (not shown) disposed in holding troughs 25 and 26. The holding arms 23 and 24 are interconnected at a pivot joint 27, so that they can be moved in the manner of tongs.

The joint 27 is carried by a support 28. The support or carriage 28 is displaceable back and forth over a predetermined distance upon the bracket 11. This carriage type support 28 is retained by a bolt 29 against a guideway on the bracket 11. Tightening of a nut 30 on the bolt 29 (together forming a type of stop means) prevents the displacement of the support or carriage 28. Carriage 28 is connected to yoke 16 by means of a drive rod 31. This drive rod 31 is rigidly connected with yoke 16 and extends through an abutment 32. The abutment 32 is affixed upon carriage 28. On the drive rod 31, stops 33 and 34 are provided spaced a predetermined distance from each other and on either side of the abutment 32 and are resiliently supported by springs 35 and 36.

Figure 2:
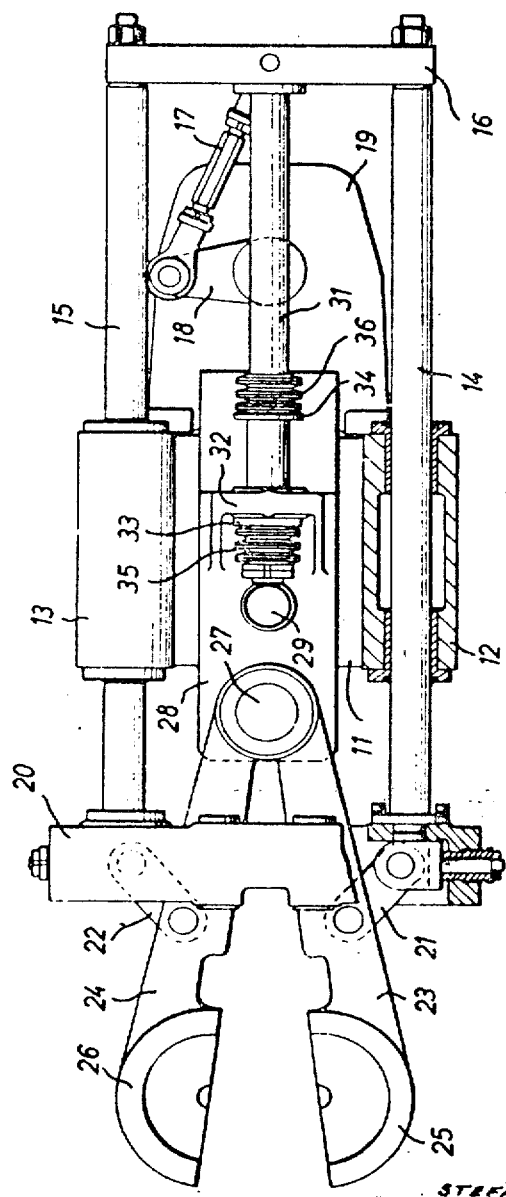
FIG. 2, a top view, partially sectioned of the device of FIG. 1.

Turning now to the operation of the device, FIG. 1 shows the position of the parts relatively to each other in the blowing position, in which the preform is shaped to form the finished body and is then ejected. For this the mold must first be opened. For this purpose the crank arm 18 pivots from the position of FIG. 1 to that of FIG. 2. As a result, the carriage, formed by the spars 14 and 15, the yoke 16, and the cross-piece 20, moves to the right. As this carriage moves, links 21 and 22 move and the holding arms 23 and 24 are pulled apart. Joint 27 at first retains its position on the braked support 28. As soon as the stops 33 of the drive rod 31, strikes against the abutment 32, support 28 moves with the yoke 16, until the crank arm 18 has rotated 180° with respect to its position in FIG. 1. Support 28 is now positioned such that the opened mold halves are in the receiving position for the preform. When the crank arm 18 is then set in motion again, spars 14 and 15 are moved via yoke 16 in the opposite direction. The spars 14 and 15 act upon the links 21 and 22 and through these on the holding arms 23 and 24 for the mold halves. This movement closes the mold halves. Meanwhile joint 27 retains its position due to the braking of the support carriage 28. In the closed position of the mold halves, the links 21 and 22 reach a position in which their longitudinal axis extends approximately at right angles with the axis of the spars 14 and 15. In the closed position of the mold halves, the drive rod 31, connected with yoke 16, has become displaced to the extent that its stop 34 rests against the abutment 52 of support 28. With the further movement of the crank arm 18 into the position according to FIG. 1, support 28 for the mold halves is then taken along into the position according to FIG. 1, in which the blowing up to the finished body takes place.

We claim:

1. A device for opening and closing mold halves held in a pair of tong-like arm holding elements and for moving same back and forth with respect to a machine frame between a receiving position for a moldable preform to another position for shaping or blowing same, comprising: first and second carriage means mounted on said machine frame and being adapted to reciprocate in said machine frame; a single drive means adapted to respectively reciprocate both of said first and second carriage means; the second carriage means carrying said mold halves and having brake means for restraining the motion of said second carriage means with respect to said machine frame; said first carriage means being connected to said second carriage means and being provided with resilient stop means for arresting the motion of said first carriage means with respect to said second carriage means at the open and closed positions of said arm holding elements, and said second carriage means moving from one position to another position upon the continued respective motion of said drive means overcoming said resilient stop means.

2. The device according to claim 1, wherein said brake means is adjustable so as to compensate for any premature movement of said second carriage means with respect to said first carriage means.

3. The device according to claim 1, wherein said first carriage means comprises a pair of spars and yokes; said spars being movably mounted upon said frame means and connected to said yokes at their ends; and said drive means acting on one of said yokes.

4. The device according to claim 3, including a drive rod connecting said second carriage means to said one of said yokes of said first carriage means.

5. The device according to claim 4, including a motor driven crank arm element and a connecting rod pivotally connected at its ends to said crank arm element and said one of said yokes of said first carriage means.

6. The device according to claim 4, including a pair of drive links, each pivotably connected at its ends to one of said arm holding elements and to the other of said pair of yokes; and said arm holding elements being pivotably connected to said second carriage means about a common axis.

* * * * *